United States Patent
Nozaki (10) Patent No.: US 11,463,659 B2
(45) Date of Patent: Oct. 4, 2022

(54) MONITORING SYSTEM, MONITORING METHOD, AND STORAGE MEDIUM

(71) Applicants: Kabushiki Kaisha Toshiba, Tokyo (JP); Toshiba Infrastructure Systems & Solutions Corporation, Kawasaki (JP)

(72) Inventor: Masahiro Nozaki, Komae (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/177,308

(22) Filed: Feb. 17, 2021

(65) Prior Publication Data

US 2021/0168333 A1    Jun. 3, 2021

Related U.S. Application Data (63) Continuation of application No. PCT/JP2019/032252, filed on Aug. 19, 2019.

(30) Foreign Application Priority Data

Aug. 20, 2018  (JP) .............................. JP2018-154186

(51) Int. Cl.
- *H04N 7/18* (2006.01)
- *G06F 21/60* (2013.01)
- *H04N 5/913* (2006.01)

(52) U.S. Cl.
CPC .......... *H04N 7/181* (2013.01); *G06F 21/602* (2013.01); *H04N 5/913* (2013.01); *H04N 2005/91357* (2013.01)

(58) Field of Classification Search
None
See application file for complete search history.

(56) References Cited

U.S. PATENT DOCUMENTS

| 6,744,461 | B1 | 6/2004 | Wada et al. |
| 7,343,559 | B1* | 3/2008 | Fujita ................. G06Q 30/06 707/E17.031 |

(Continued)

FOREIGN PATENT DOCUMENTS

| JP | 2001-69494 A | 3/2001 |
| JP | 2003-153252 A | 5/2003 |

(Continued)

OTHER PUBLICATIONS

International Search Report dated Nov. 5, 2019 in PCT/JP2019/032252 filed Aug. 19, 2019 (with English translation), 4 pages.

(Continued)

*Primary Examiner* — Gelek W Topgyal
(74) *Attorney, Agent, or Firm* — Maier & Maier, PLLC (57) ABSTRACT

A monitoring system of an embodiment includes an acquirer, an extractor, an encryption processor, and a generator. The acquirer is configured to acquire, from one or more monitoring cameras that capture an image of a work area in which presented information to be input is input to an input terminal, a captured image captured by the one or more monitoring cameras. The extractor is configured to extract the information to be input from the captured image acquired by the acquirer. The encryption processor is configured to encrypt the information to be input extracted by the extractor. The generator is configured to generate a replaced image in which the information to be input is made invisible, the replaced image comprising a partial image that displays information encrypted by the encryption processor (Continued)

at a position of the information to be input in the captured image acquired by the acquirer.

7 Claims, 5 Drawing Sheets

(56) References Cited

U.S. PATENT DOCUMENTS

| | | | | |
|---|---|---|---|---|
| 8,823,798 | B2* | 9/2014 | Bernal | G06K 9/00228 |
| | | | | 348/149 |
| 2004/0081338 | A1 | 4/2004 | Takenaka | |
| 2008/0002911 | A1* | 1/2008 | Eisen | G06F 40/166 |
| | | | | 382/283 |
| 2009/0257589 | A1 | 10/2009 | Yokota et al. | |
| 2013/0162817 | A1* | 6/2013 | Bernal | G06K 9/00228 |
| | | | | 348/143 |
| 2018/0046814 | A1* | 2/2018 | Manoharan | G06F 21/62 |
| 2019/0222774 | A1* | 7/2019 | Kobayashi | G02B 27/017 |
| 2019/0318382 | A1* | 10/2019 | Yang | G06Q 30/0255 |

FOREIGN PATENT DOCUMENTS

| | | |
|---|---|---|
| JP | 2004-62560 A | 2/2004 |
| JP | 2005-323007 A | 11/2005 |
| JP | WO 2006/115156 A1 | 11/2006 |
| JP | 2010-62699 A | 3/2010 |
| JP | 2011-193115 A | 9/2011 |
| KR | 10-2008-0035110 A | 4/2008 |

OTHER PUBLICATIONS

Extended European Search Report dated Apr. 21, 2022, in European Patent Application No. EP 19 85 2847.3.

* cited by examiner

KEY CREATION SHEET

KEY NO. _____________ TYPE: KEY

CREATION DATE: AUG. 1ST, 2018

| 1 | 2 | 3 | 4 | 5 | 6 | 7 | 8 | 9 | 0 | A | B | C | あ | い | う |

FIG. 6

# MONITORING SYSTEM, MONITORING METHOD, AND STORAGE MEDIUM

CROSS-REFERENCE TO RELATED APPLICATION

This application is based upon and claims the benefit of priority from Japanese Patent Application No. 2018-154186, filed Aug. 20, 2018 and PCT/JP2019/032252, filed Aug. 19, 2019; the entire contents all of which are incorporated herein by reference.

FIELD

An embodiment of the present invention relates to a monitoring system, a monitoring method, and a storage medium.

BACKGROUND

Conventionally, when an inconvenient object is shown in a monitoring image captured by a monitoring camera, it is known to mask the inconvenient part in the monitoring image and to insert character information such as "it cannot be displayed because it is a public prohibited part" into a mask area. However, it is not possible to even indirectly acquire information that should have been displayed in the masked part in a conventional technology, which is inconvenient in some cases.

A monitoring system of an embodiment includes an acquirer, an extractor, an encryption processor, and a generator. The acquirer is configured to acquire, from one or more monitoring cameras that capture an image of a work area in which presented information to be input is input to an input terminal, a captured image captured by the one or more monitoring cameras. The extractor is configured to extract the information to be input from the captured image acquired by the acquirer. The encryption processor is configured to encrypt the information to be input extracted by the extractor. The generator is configured to generate a replaced image in which the information to be input is made invisible, the replaced image comprising a partial image that displays information encrypted by the encryption processor at a position of the information to be input in the captured image acquired by the acquirer.

DETAILED DESCRIPTION

A monitoring system of an embodiment includes an acquirer, an extractor, an encryption processor, and a generator. The acquirer is configured to acquire, from one or more monitoring cameras that capture an image of a work area in which presented information to be input is input to an input terminal, a captured image captured by the one or more monitoring cameras. The extractor is configured to extract the information to be input from the captured image acquired by the acquirer. The encryption processor is configured to encrypt the information to be input extracted by the extractor. The generator is configured to generate a replaced image in which the information to be input is made invisible, the replaced image comprising a partial image that displays information encrypted by the encryption processor at a position of the information to be input in the captured image acquired by the acquirer.

Hereinafter, a monitoring system, a monitoring method, and a storage medium of an embodiment will be described with reference to the drawings.

[Overall Configuration]

Figure 1:
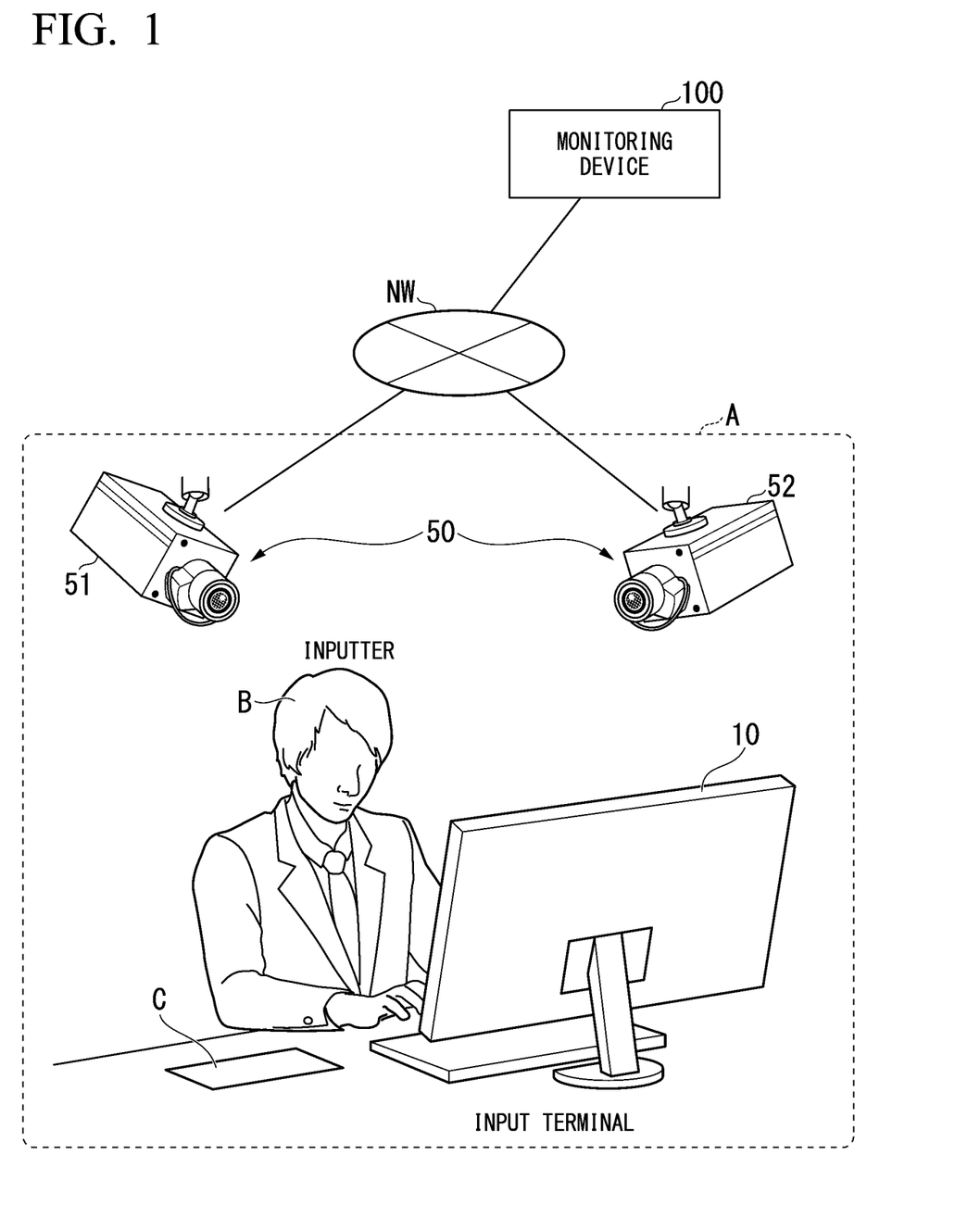
FIG. 1 is a diagram which shows an example of a configuration of a monitoring system 1 according to an embodiment.

FIG. 1 is a diagram which shows an example of a configuration of a monitoring system 1 of an embodiment. The monitoring system 1 includes, for example, an input terminal 10, one or more monitoring cameras 50, and a monitoring device 100. The monitoring cameras 50 and the monitoring device 100 are connected to each other by a network NW, and communicate with each other via the network NW. The network NW includes, for example, some or all of a wide area network (WAN), a local area network (LAN), the Internet, a dedicated line, a wireless base station, a provider, and the like.

The input terminal 10 is installed in a work area A and operated by an inputter B. The inputter B prepares a sheet C on which information to be input is described at hand. The inputter B inputs the information to be input described on the sheet C to the input terminal 10 by operating, for example, a keyboard. Note that the input terminal 10 has a voice recognition function, and the information to be input may be input thereto on the basis of information collected by a microphone. The input terminal 10 is, for example, a tablet terminal or a personal computer.

Figure 2:
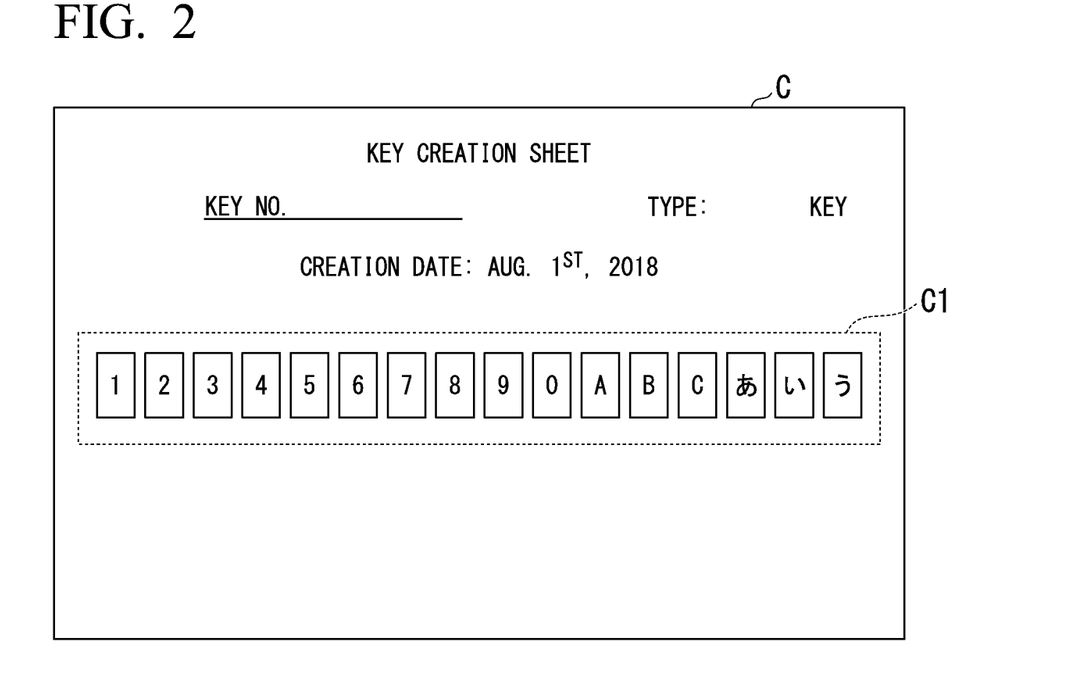
FIG. 2 is a diagram which shows an example of a sheet C.

FIG. 2 is a diagram which shows an example of the sheet C. Information to be input C1 is described on the sheet C. The information to be input C1 has, for example, 16 characters or numbers, and is described in a frame. Additional information such as identification information, a type, or a date of the information to be input C1 may also be described on the sheet C.

The monitoring cameras 50 capture an image of the work area A and generate captured image data. The captured image data may be still image data, and may also be moving image data. Hereinafter, the captured image data may be referred to as a captured image. The monitoring cameras 50 transmit the generated captured image to the monitoring device 100 via the network NW. A plurality of monitoring cameras 50 are installed in, for example, the work area A, and include a monitoring camera 51 that captures a state of work from a side behind the inputter B, a monitoring camera 52 that captures a face of the inputter B from a side in front of the inputter B, and the like. The work area A is not limited to one area, and may be plural areas. In addition, a plurality of work areas A may be prepared in the same room or may be prepared in different rooms.

A monitoring person monitors a state in the work area A while viewing an image that is processed by the monitoring device 100 for a captured image captured by the monitoring camera 50.

[Monitoring Device]

Figure 3:
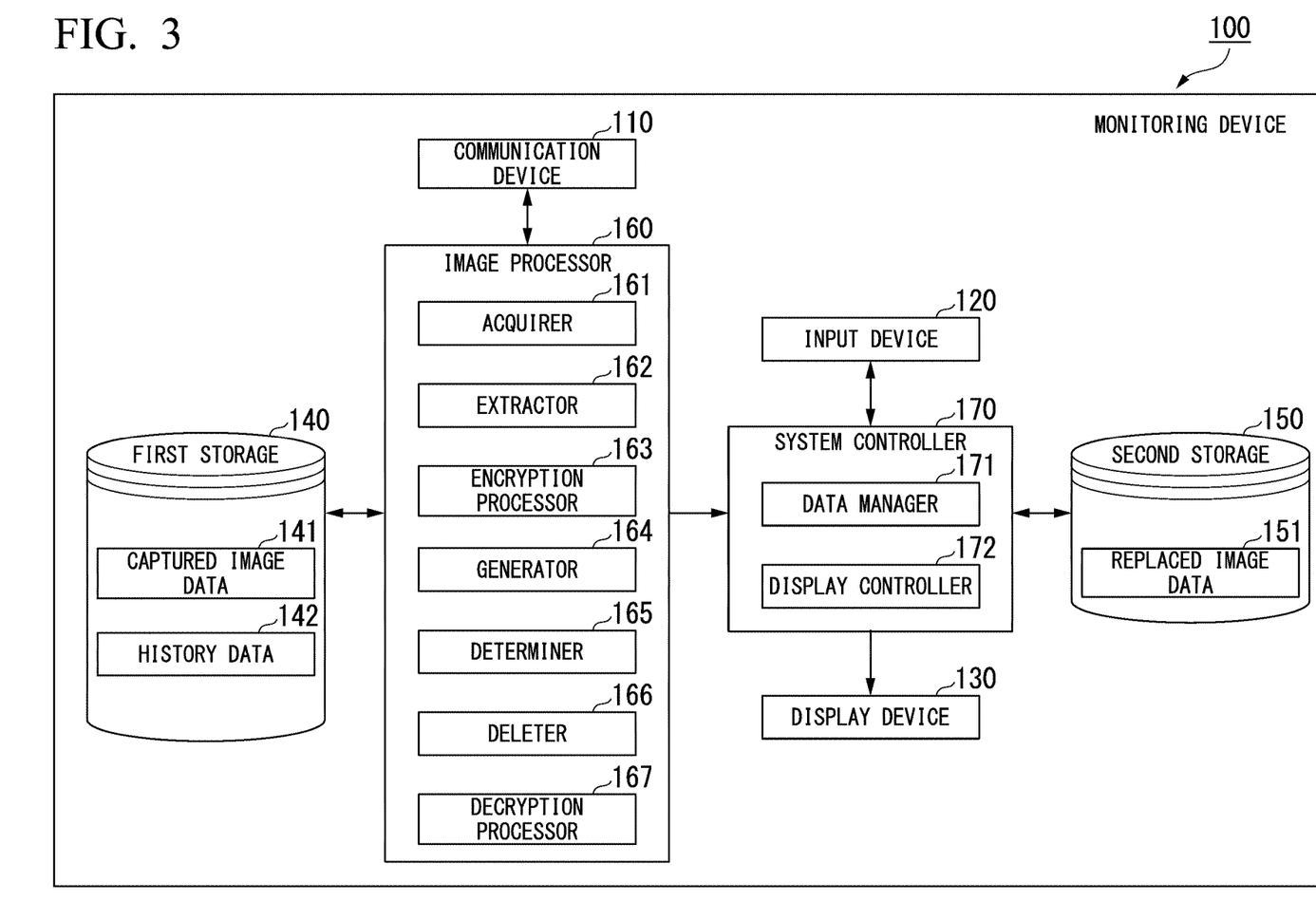
FIG. 3 is a diagram which shows an example of a configuration of a monitoring device 100.

FIG. 3 is a diagram which shows an example of a configuration of the monitoring device 100. The monitoring device 100 includes, for example, a communication device 110, an input device 120, a display device 130, a first storage 140, a second storage 150, an image processor 160, and a system controller 170.

The communication device 110 includes hardware for connecting to the network NW using a cellular network, a Wi-Fi network, or the like. For example, the communication device 110 includes an antenna, a transmitter/receiver, and the like. The input device 120 includes, for example, some or all of various keys, buttons, dial switches, a mouse, a microphone, a touch panel formed integrally with the display device 130, and the like. The display device 130 may include, for example, a liquid crystal display (LCD) or an organic electroluminescence (EL) display device. The display device 130 may include a speaker, a lamp, and the like.

The first storage 140 and the second storage 150 are realized by, for example, a random access memory (RAM), a flash memory, an SD card, a register, and the like. The first storage 140 temporarily stores a captured image generated by the monitoring cameras 50 as captured image data 141. In addition, the first storage 140 stores history data 142. The history data 142 is information in which the information to be input is associated with an image generated on the basis of the information to be input. The second storage 150 may be an external storage device such as a network attached storage (NAS) which can be accessed by the monitoring device 100 via the network. The second storage 150 stores replaced image data 151 generated by the image processor 160 and a history.

The image processor 160 includes, for example, an acquirer 161, an extractor 162, an encryption processor 163, a generator 164, a determiner 165, and a deleter 166. Some or all of these components are realized by, for example, a processor such as a central processing unit (CPU) executing a program (software) stored in the first storage 140. In addition, some or all of functions of these components may be realized by hardware (circuit unit: including circuitry) such as a large scale integration (LSI), an application specific integrated circuit (ASIC), a field-programmable gate array (FPGA), or a graphics processing unit (GPU), and may also be realized by cooperation of software and hardware. The program may be stored in advance in a storage device such as a hard disk drive (HDD) or a flash memory, or may also be stored in a detachable storage medium such as a DVD or a CD-ROM and installed by the storage medium being mounted in a drive device.

When the captured image is moving image data, the image processor 160 executes the following processing for each frame included in the moving image data.

The acquirer 161 acquires captured images from the monitoring cameras 50 using the communication device 110.

Figure 4:
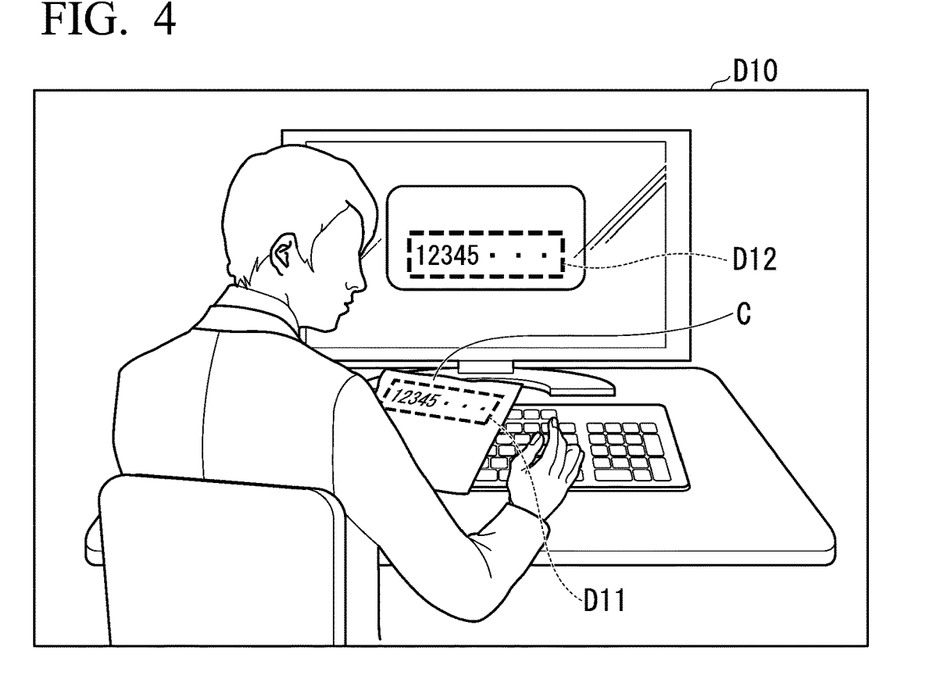
FIG. 4 is a diagram which shows an example of a captured image.

The acquirer 161 temporarily stores the acquired captured image in the first storage 140. An example of the captured image is shown in FIG. 4. A captured image D10 shown in FIG. 4 is an image captured from behind the inputter B by the monitoring camera 51.

The extractor 162 extracts the information to be input from the captured image acquired by the acquirer 161. For example, the extractor 162 recognizes the information to be input on the basis of a predetermined format of information to be input and extracts a target image including the recognized information to be input by performing an image analysis on the captured image using a character recognition technology. The character recognition technology is a technology that recognizes characters or numbers contained in an image.

The "predetermined format of information to be input" includes, for example, a character string composed of a predetermined number of characters, a format composed of a predetermined number of numbers, a format that is a combination of characters and numbers and in which positions of the characters and positions of the numbers are predetermined, and the like. In addition, the predetermined format of information to be input may include an arrangement of characters or numbers, an arrangement of characters or numbers horizontally in a row, an arrangement of characters or numbers vertically in two columns, and the like.

The extractor 162 extracts information to be input on the basis of, for example, an input area associated with the "predetermined format of information to be input." The input area includes, for example, a frame printed on the sheet C as shown in FIG. 2, an input field displayed on the monitor of the input terminal 10, and the like. Thereby, the extractor 162 can extract information to be input even when part of the information to be input is displayed on the monitor while being input. In addition, the extractor 162 may recognize all the characters or numbers included in a captured image, and extract characters or numbers that match the predetermined format of information to be input among the recognized characters or numbers as information to be input.

The extractor 162 determines an image area (hereinafter, described as a target area) that includes the extracted information to be input and cuts out an image of the target area (hereinafter, described as a target image). For example, the extractor 162 may determine a target area in accordance with the input area. The extractor 162, not limited thereto, may determine a target area in accordance with a circumscribed minimum rectangle of the recognized characters or numbers. The circumscribed minimum rectangle is a rectangular figure that is set such that a string of characters or numbers (which may be one character or number) recognized as information to be input does not protrude therefrom, and has the smallest area. The extractor 162 may determine the target area by providing a predetermined margin outside the input area or the circumscribed minimum rectangle.

For example, the extractor 162 extracts a target image D11 including information to be input that has been displayed on the sheet C and a target image D12 including information to be input that has been displayed on the monitor of the input terminal 10 from the captured image D10 shown in FIG. 4.

The encryption processor 163 encrypts the information to be input that has been extracted by the extractor 162 and generates encrypted information. The encrypted information includes characters (hiragana, katakana, alphabet, and the like), numbers, and the like. For example, the encryption processor 163 encrypts information to be input using a predetermined encryption algorithm.

Various algorithms can be used for encryption processing. For example, the encryption processor 163 may perform encryption using key information and may also perform encryption according to a predetermined rule. Moreover, the encryption processor 163 may generate key information for performing decryption in the encryption processing.

The generator 164 generates a partial image on the basis of information encrypted by the encryption processor 163. The partial image is, for example, an image in which the information to be input is made invisible and is an image that displays information for acquiring encrypted information generated by the encryption processor 163.

The generator 164 generates a partial image in which the encrypted information is superimposed on a filled image (a mask image). In addition, the generator 164 may generate a partial image that displays a code obtained by encoding encrypted information (including a one-dimensional code, a two-dimensional code, and the like), or may also generate a mosaic image in which the encrypted information is embedded as a partial image.

The partial image, not limited thereto, may be an image in which the information to be input is made invisible, and may also be an image that displays information for acquiring key information for decrypting information that has been encrypted by the encryption processor 163. For example, the generator 164 may generate a partial image in which the key information is superimposed on the filled image. In addition, the generator 164 may also generate a partial image that displays a code obtained by encoding the key information, and may also generate a mosaic image in which the key information is embedded as a partial image.

The generator 164 generates a replaced image in which the information to be input is made invisible by displaying the partial image in the target area (a position of the information to be input) instead of the target image in the captured image acquired by the acquirer 161. The generator 164 outputs the generated replaced image to the system controller 170.

Figure 5:
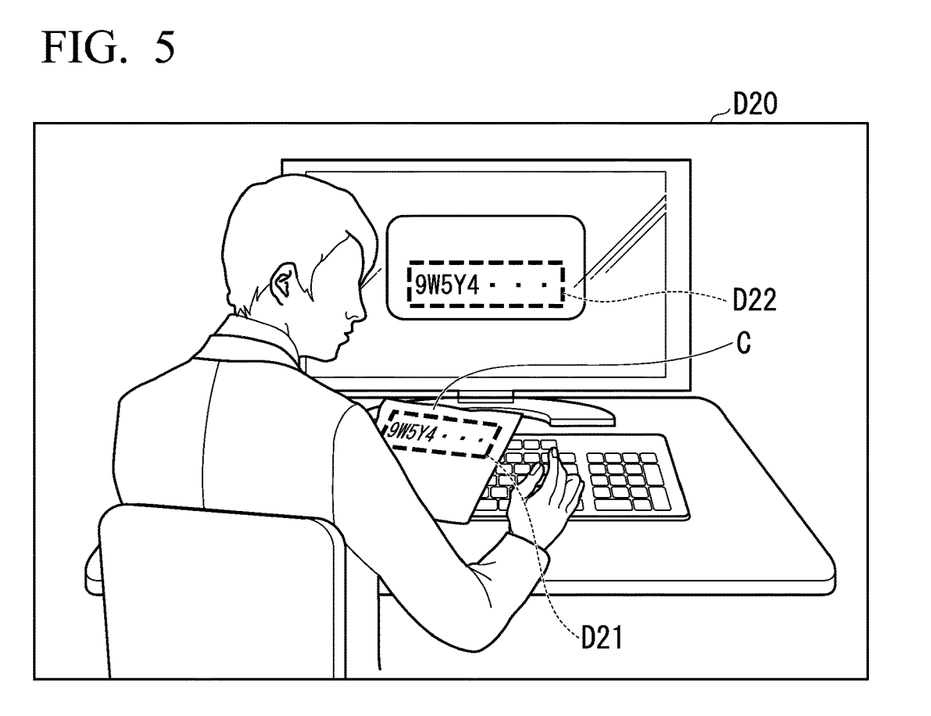
FIG. 5 is a diagram which shows an example of a replaced image.

FIG. 5 is a diagram which shows an example of a replaced image. A replaced image data D20 includes a partial image D21 which is replaced with the target image D11, and a partial image D22 which is replaced with the target image D12.

The partial image D21 and the partial image D22 are the same in the example shown in FIG. 5, but the present invention is not limited thereto. For example, the partial image D21 and the partial image D22 may include different encrypted information if information to be input is being input. Specifically, information to be input that has been extracted at a time when three characters are input and information to be input that has been extracted at a time when ten characters are input are different. For this reason, the encrypted information may change during an input and a different image may be displayed in a replaced image, and encrypted information displayed in a target area included in the monitor may switch each time a character is input.

The generator 164 stores information to be input that has been extracted by the extractor 162 and a partial image generated on the basis of the information to be input in the history data 142 in association with each other.

The determiner 165 determines whether the information to be input that has been extracted by the extractor 162 matches the information to be input that has been already encrypted by the encryption processor 163. For example, the determiner 165 refers to the history data 142 and determines whether the information to be input that has been extracted by the extractor 162 is registered. When the determiner 165 determines that the extracted information to be input matches information to be input that has been already encrypted, the generator 164 generates a replaced image on the basis of a partial image read from the history data 142 without performing processing of generating a partial image.

The deleter 166 deletes an associated captured image from the first storage 140 when a replaced image is generated by the generator 164. In addition, the deleter 166 may also delete a captured image whose storage period has exceeded a threshold value.

When it is instructed to decrypt the encrypted information included in the replaced image using the input device 120, the decryption processor 167 decrypts the encrypted information on the basis of the replaced image to be input by the system controller 170. The decryption processor 167 outputs the decrypted information to the system controller 170 and causes the display device 130 to display it.

The system controller 170 includes, for example, a data manager 171 and a display controller 172. Some or all of these components are realized by, for example, a processor such as a CPU executing a program (software) stored in the second storage 150. Moreover, some or all of functions of these components may be realized by hardware such as a LSI, an ASIC, a FPGA, or a GPU, or may also be realized by cooperation between software and hardware.

The data manager 171 stores the replaced image generated by the generator 164 in the second storage 150, instead of the captured image captured by the monitoring camera 50.

The display controller 172 causes the display device 130 to display the replaced image generated by the generator 164, instead of the captured image captured by the monitoring camera 50. The display controller 172 may cause the display device 130 to display the replaced image on the basis of a replaced image input from the image processor 160, or may read a replaced image stored in the second storage 150 by the data management unit 171 and cause the display device 130 to display it.

In addition, when it is instructed to view a past image, the display controller 172 reads the instructed replaced image from the second storage 150 and causes the display device 130 to display it. When it is instructed to decrypt the encrypted information using the input device 120, the display controller 172 causes the display device 130 to display information to be input decrypted by the decryption processor 167.

[Flowchart]

Figure 6:
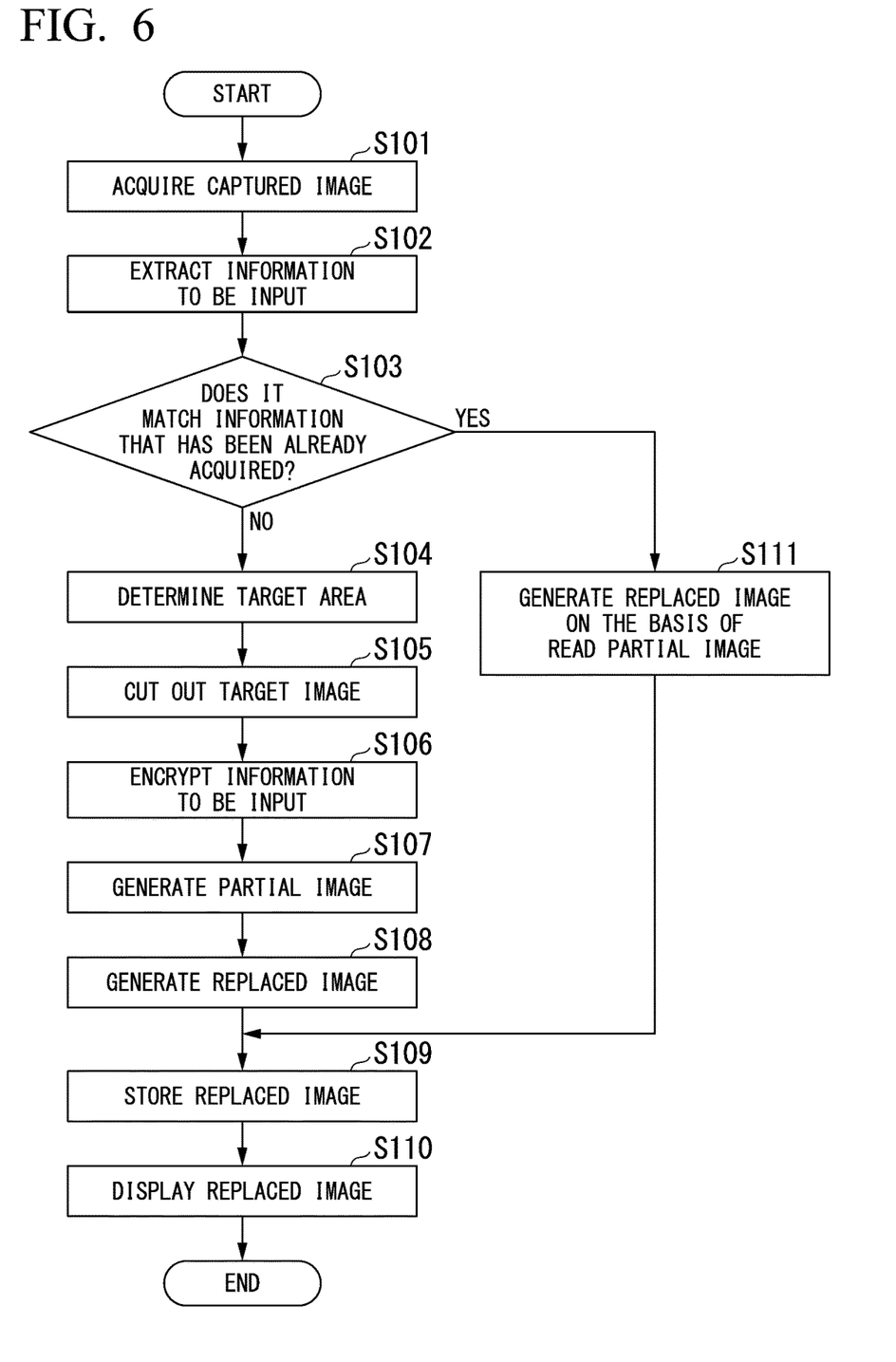
FIG. 6 is a flowchart which shows an example of processing performed by the monitoring device 100.

FIG. 6 is a flowchart which shows an example of processing performed by the monitoring device 100. The monitoring device 100 executes the following processing for each captured image. When a captured image is part of a moving image, the monitoring device 100 executes the following processing for each frame included in an operation.

First, the acquirer 161 acquires a captured image from the monitoring cameras 50 using the communication device 110 (step S101). The extractor 162 extracts information to be input from the captured image acquired by the acquirer 161 (step S102). The determiner 165 refers to the history data 142 and determines whether the information to be input that has been extracted by the extractor 162 matches information to be input that has been already encrypted by the encryption processor 163 (step S103).

When the information to be input that has been extracted by the extractor 162 does not match the information to be input that has been already encrypted by the encryption processor 163, the extractor 162 determines a target area (step S104) and cuts off the determined target area (step S105). The encryption processor 163 encrypts the information to be input that has been extracted by the extractor 162 (step S106). The generator 164 generates a partial image on the basis of information encrypted by the encryption processor 163 (step S107). Next, the generator 164 generates a replaced image that displays the partial image in the target area in which a target image is cut out in step S105 (step S108). Then, the generator 164 outputs the replaced image to the system controller 170.

The data manager 171 stores the replaced image output from the generator 164 in the second storage 150 (step S109). The display controller 172 causes the display device 130 to display the replaced image generated by the generator 164 (step S110).

On the other hand, when the information to be input that has been extracted by the extractor 162 matches the information to be input that has been already encrypted by the encryption processor 163 in step S103, the generator 164 reads a partial image associated with the information to be input that has been extracted by the extractor 162 from the first storage 140, and generates a replaced image on the basis of the read partial image (step S111). For example, step S111 is executed at a timing at which the same information to be input as the information to be input that has been already encrypted is extracted from the captured image. Since the information to be input that has been displayed on the sheet C on an image does not change during input work, the generator 164 uses a partial image that has been first generated when information to be input is captured by the monitoring camera 50, and causes it to be displayed in a target area associated with information to be input that has been extracted from a captured image thereafter.

In this manner, the monitoring device 100 can cause the display device 130 to display the replaced image in which the information to be input is not displayed. Accordingly, it is possible to keep the information to be input secret from a monitoring person who monitors a work area A while viewing the display device 130. Confidentiality obligation is often imposed on the inputter B, but there are some cases where the confidentiality obligation is not imposed on the monitoring person. It is especially beneficial in this case.

In addition, the monitoring device 100 can cause the display device 130 to display a replaced image including encrypted information and the like or transmit the replaced image to an external device having a monitor at the time of monitoring almost in real time by a monitoring person or at the time of viewing a past image. Thereby, information to be input can be acquired by decrypting the information to be input that is made invisible using encrypted information and the like displayed in the replaced image. Therefore, the information to be input can be easily acquired even when there is a situation in which associating of the information to be input with the captured image captured by the monitoring camera 50 later and checking of it are required. On the other hand, when a captured image is an image which is obtained by merely replacing a target area with a mask image, since it is impossible to associate the information to be input with the captured image thereafter and to check it even when there is a situation in which the associating and the checking are required later, which is inconvenient.

According to at least one embodiment described above, it is possible to check information to be input when checking of the information to be input is required while making the information to be input invisible on the replaced screen by including an acquirer configured to acquire, from one or more monitoring cameras that capture an image of a work area in which presented information to be input is input to an input terminal, a captured image captured by the one or more monitoring cameras, an extractor configured to extract the information to be input from the captured image acquired by the acquirer, an encryption processor configured to encrypt the information to be input extracted by the extractor, and a generator configured to generate a replaced image in which the information to be input is made invisible, the replaced image including a partial image that displays information encrypted by the encryption processor at a position of the information to be input in the captured image acquired by the acquirer. Therefore, it is possible to improve a convenience in a system that masks part of the monitoring camera.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the image processor 160 may execute different processing in accordance with a subject including a target area in a captured image. For example, the different processing may also be executed when the subject including a target area is the sheet C, and when the subject including a target area is the monitor of the input terminal 10. This is because information to be input in the monitor changes according to input work although information to be input on the sheet C of an image does not change. A specific example thereof will be described below.

The image processor 160 generates a partial image in the sheet C on an image on the basis of encrypted information obtained by encrypting information to be input that has been extracted from the sheet C on the image. On the other hand, the image processor 160 generates a partial image in the monitor on an image on the basis of the encrypted information obtained by encrypting the information to be input that has been extracted from the sheet C on an image instead of information to be input that has been extracted from the monitor on the image. Thereby, a processing load of the encryption processing can be reduced. In addition, the information to be input that is extracted from the monitor changes during an input, but, even in such a situation, partial images including the same encrypted information can be displayed and a replaced screen can be made easier to view.

In addition, the encryption processor 163 may also change an algorithm of encrypting a captured image when a predetermined switching timing is reached. The predetermined switching timing includes a case in which a predetermined time has been elapsed, a case in which extracted information to be input is different from information to be input that has been previously extracted, a case in which a predetermined format of information to be input is different from a previous format, and the like. Moreover, the encryption processor 163 may also change an algorithm of encrypting a captured image in accordance with the predetermined format of information to be input.

What is claimed is:

1. A monitoring system comprising:
   a central processing unit (CPU) configured to execute processes to:
   acquire, from one or more monitoring cameras that capture an image of a work area in which presented information on a sheet to be input is input to an input terminal, a captured image captured by the one or more monitoring cameras;
   extract the information to be input corresponding to each other both on the sheet and on the input terminal from the acquired captured image;
   encrypt the extracted information to be input;
   embed, in the encrypted information to be input, key information for decrypting the encrypted information to be input to generate a partial image; and
   replace the information to be input in the acquired captured image with the generated partial image to generate a replaced image in which the information to be input is made invisible.

2. The monitoring system according to claim 1, wherein the CPU is further configured to cause a storage to store the captured image captured by the one or more monitoring cameras, and, in a case where the replaced image is generated, to cause the storage to store the replaced image instead of the captured image.

3. The monitoring system according to claim 1, wherein the CPU is further configured to cause a display device to display the captured image captured by the one or more monitoring cameras, and, in a case where the replaced image is generated, to cause the display device to display the replaced image instead of the captured image.

4. The monitoring system according to claim 1,
wherein the CPU is further configured to determine whether the extracted information to be input matches the information to be input that has been encrypted, and
wherein, in a case where the CPU determines that the extracted information to be input matches the information to be input that has been encrypted, the CPU generates the replaced image on the basis of the invisible image already converted.

5. The monitoring system according to claim 1,
wherein, in a case where a predetermined switching timing is reached, the CPU changes an algorithm for encrypting the captured image.

6. A monitoring method comprising:
by a computer,
acquiring, from one or more monitoring cameras that capture an image of a work area in which presented information on a sheet to be input is input to an input terminal, a captured image captured by the one or more monitoring cameras;
extracting the information to be input corresponding to each other both on the sheet and on the input terminal from the acquired captured image;
encrypting the extracted information to be input;
embedding, in the encrypted information to be input, key information for decrypting the encrypted information to be input to generate a partial image; and
replacing the information to be input in the acquired captured image with the generated partial image to generate a replaced image in which the information to be input is made invisible.

7. A non-transitory computer-readable storage medium storing a program that causes a computer to execute:
acquiring, from one or more monitoring cameras that capture an image of a work area in which presented information on a sheet to be input is input to an input terminal, a captured image captured by the one or more monitoring cameras;
extracting the information to be input corresponding to each other both on the sheet and on the input terminal from the acquired captured image;
encrypting the extracted information to be input;
embedding, in the encrypted information to be input, key information for decrypting the encrypted information to be input to generate a partial image; and
replacing the information to be input in the acquired captured image with the generated partial image to generate a replaced image in which the information to be input is made invisible.

* * * * *